United States Patent
Zhu et al.

(10) Patent No.: US 10,866,129 B2
(45) Date of Patent: *Dec. 15, 2020

(54) VIBRATION-TYPE SENSOR FOR MEASURING THE DENSITY AND/OR MASS FLOW RATE OF A MEDIUM

(71) Applicant: Endress+Hauser Flowtec AG, Reinach (CH)

(72) Inventors: Hao Zhu, Freising (DE); Alfred Rieder, Landshut (DE); Ennio Bitto, Aesch (CH); Gerhard Eckert, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/471,648

(22) PCT Filed: Nov. 22, 2017

(86) PCT No.: PCT/EP2017/080083
§ 371 (c)(1),
(2) Date: Jul. 23, 2019

(87) PCT Pub. No.: WO2018/114197
PCT Pub. Date: Jun. 28, 2018

(65) Prior Publication Data
US 2019/0383658 A1    Dec. 19, 2019

(30) Foreign Application Priority Data

Dec. 23, 2016 (DE) .......................... 10 2016 125 615

(51) Int. Cl.
*G01F 1/84* (2006.01)
*G01N 9/00* (2006.01)

(52) U.S. Cl.
CPC .......... *G01F 1/8477* (2013.01); *G01F 1/8413* (2013.01); *G01F 1/8422* (2013.01); *G01N 9/002* (2013.01); *G01N 2009/006* (2013.01)

(58) Field of Classification Search
None
See application file for complete search history.

(56) References Cited

U.S. PATENT DOCUMENTS 4,660,421 A * 4/1987 Dahlin .................. G01F 1/8422
73/861.356
4,756,198 A    7/1988 Levien
(Continued)

FOREIGN PATENT DOCUMENTS

CN         1231029 A     10/1999
CN         103180695 A    6/2013
(Continued)

*Primary Examiner* — Harshad R Patel
(74) *Attorney, Agent, or Firm* — Christopher R. Powers; Endress+Hauser (USA) Holding Inc.

(57) ABSTRACT

The present disclosure relates to a vibration-type sensor for measuring the density and/or the mass flow rate of a medium, having at least one first oscillator, the sensor including: a curved first measuring tube; a curved second measuring tube; at least one first elastic vibration coupler that couples the first measuring tube and the second measuring tube to each; and at least one exciter for exciting oscillator vibrations in a bending vibration mode. The oscillator has a first oscillator resonant frequency for when the measuring tubes vibrate approximately in phase in the bending vibration mode and a greater second oscillator resonant frequency for when the measuring tubes vibrate approximately in counterphase in the bending vibration mode. The first and second measuring tubes have resonant frequencies differing from their arithmetic mean by no more than 8%, no more than 4%, no more than 2% or no more than 1%.

7 Claims, 5 Drawing Sheets

(56) References Cited

U.S. PATENT DOCUMENTS

| | | | |
|---|---|---|---|
| 2010/0257943 A1* | 10/2010 | Huber | G01F 1/74 73/861.357 |
| 2012/0167697 A1 | 7/2012 | Rieder et al. | |
| 2012/0279317 A1 | 11/2012 | Bitto et al. | |
| 2014/0000374 A1* | 1/2014 | Rieder | G01F 1/8477 73/658 |

FOREIGN PATENT DOCUMENTS

| | | |
|---|---|---|
| CN | 103562689 A | 2/2014 |
| CN | 110073178 A | 7/2019 |
| DE | 102004035971 A1 | 2/2006 |
| DE | 102009055069 A1 | 6/2011 |
| DE | 10201101078 A1 | 8/2012 |
| DE | 102015104931 A1 | 6/2016 |

\* cited by examiner

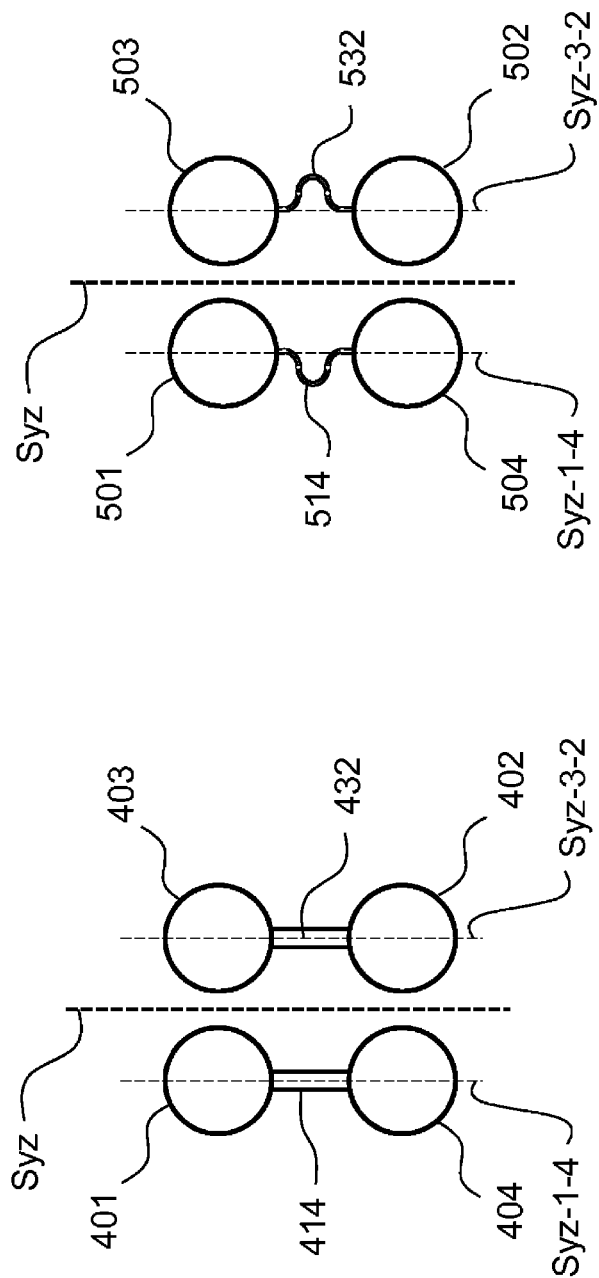

VIBRATION-TYPE SENSOR FOR MEASURING THE DENSITY AND/OR MASS FLOW RATE OF A MEDIUM

CROSS-REFERENCE TO RELATED APPLICATIONS

The present application is related to and claims the priority benefit of German Patent Application No. 10 2016 125 615.3, filed on Dec. 23, 2016, and International Patent Application No. PCT/EP2017/080083 filed on Nov. 22, 2017, the entire contents of which are incorporated herein by reference.

TECHNICAL FIELD

The present invention relates to a vibration-type sensor for measuring the density and/or mass flow rate of a medium, having at least one oscillator with two measuring tubes coupled to a vibration coupler, wherein the measuring tubes are curved in the same direction in the idle position.

BACKGROUND

Such a transducer is disclosed, for example, in published patent application DE 10 2011 010 178 A1. The measuring tubes are coupled to oscillators in pairs, wherein two measuring tubes on top of one another respectively form one oscillator. However, the coupling shown there appears very rigid, so that, between the measuring tubes, which have foreseeable resonant frequencies of great deviation, great constraining forces and mechanical stresses between the coupled measuring tubes are to be expected, which impair the measuring accuracy and sensitivity of the sensor. The aim of the invention is, therefore, to find a remedy.

SUMMARY

The vibration-type sensor according to the invention for measuring the density and/or the mass flow rate of a medium is a sensor having at least a first oscillator comprising: a first measuring tube, which is curved in its idle position and has a first measuring tube center line, which runs mirror-symmetrically with respect to a first measuring tube transverse plane, wherein the first measuring tube is designed to vibrate in a first bending vibration mode, which is mirror-symmetrical in relation to the first measuring tube transverse plane; a second measuring tube which is curved in its idle position and has a second measuring tube center line, which runs mirror-symmetrically with respect to the first measuring tube transverse plane, wherein the second measuring tube is designed to vibrate in the first bending vibration mode, which is mirror-symmetrical in relation to the first measuring tube transverse plane;

at least one first elastic vibration coupler, which couples the first measuring tube and the second measuring tube together to the oscillator; and at least one exciter for exciting oscillator vibrations at least in the first bending vibration mode, wherein the first measuring tube is curved in its idle position, wherein the second measuring tube is curved in its idle position, wherein a first measuring tube longitudinal plane is given, in which the integral over the square of the distance between the first measuring tube longitudinal axis and the first measuring tube longitudinal plane is minimal, wherein the first measuring tube vibrates substantially perpendicularly to the first measuring tube longitudinal plane when in the first bending vibration mode, wherein the second measuring tube is curved in its idle position, wherein a second measuring tube longitudinal plane is given, in which the integral over the square of the distance between the second measuring tube longitudinal axis and the second measuring tube longitudinal plane is minimal, wherein the second measuring tube vibrates substantially perpendicularly to the second measuring tube longitudinal plane when in the first bending vibration mode, wherein the first measuring tube and the second measuring tube are curved in the same direction, wherein the oscillator has a first oscillator resonant frequency for a vibration mode in which the first measuring tube and the second measuring tube vibrate approximately in phase in the first bending vibration mode, wherein the oscillator has a second oscillator resonant frequency for a vibration mode in which the first measuring tube and the second measuring tube vibrate approximately in counterphase in the first bending vibration mode, wherein the second oscillator resonant frequency is greater than the first oscillator resonant frequency, wherein the first measuring tube without the elastic vibration coupler has a first measuring tube resonant frequency for the first bending vibration mode, wherein the second measuring tube without the elastic vibration coupler has a second measuring tube resonant frequency for the first bending vibration mode, wherein the two measuring tube resonant frequencies differ from their arithmetic mean by no more than 8%, in particular no more than 4%, and preferably no more than 2%, and particularly preferably no more than 1%.

Due to the slight deviations between the resonant frequencies of the measuring tubes in the first bending vibration mode, the two measuring tubes may be coupled by a comparatively weak vibration coupler to an oscillator, without great mechanical stresses occurring in the region of the vibration coupler.

In a development of the invention, the second oscillator resonant frequency is no more than two and a quarter times, in particular no more than twice, and preferably no more than 1.8 times the first oscillator resonant frequency.

In a development of the invention, the second oscillator resonant frequency is greater than the first oscillator resonant frequency by at least 4%, in particular by at least 8%, preferably by at least 16%.

The two above limits for the frequency ratio between the first oscillator resonant frequency and the second oscillator resonant frequency imply, on the one hand, a sufficient separation for excluding a crosstalk between the two vibration modes of the oscillator, and, on the other, a not too vibration coupler, whereby the mechanical stresses in the counterphase vibration mode with the second oscillator resonant frequency remain low, in particular below the range of plastic deformations.

In a development of the invention, the at least one first elastic vibration coupler couples the first measuring tube and the second measuring tube together symmetrically with respect to the measuring tube transverse plane, in particular in the measuring tube transverse plane, to the oscillator.

In a development of the invention, the first measuring tube longitudinal plane is inclined with respect to the second measuring tube longitudinal plane by no more than 8°, in particular no more than 4°, preferably no more than 2°, and particularly preferably no more than 1°.

In a development of the invention, the sensor further comprises one collector each on the inlet side and on the outlet side, wherein the measuring tubes are respectively fluidically combined with the collector on the inlet side and on the outlet side, wherein the collectors provided on the inlet side and on the outlet side are, in particular, designed to be stable such that they fulfill the functionality of a gusset plate; and a support body which rigidly connects the inlet-side collector and the outlet-side collector to one another.

In a development of the invention, the sensor further comprises at least a second oscillator comprising: a third measuring tube, which has a third measuring tube center line which runs mirror-symmetrically with respect to a second measuring tube transverse plane, wherein the third measuring tube is designed to vibrate in a first bending vibration mode which is mirror-symmetrical with respect to the second measuring tube transverse plane; a fourth measuring tube, which has a fourth measuring tube center line which runs mirror-symmetrically with respect to the first measuring tube transverse plane, wherein the second measuring tube is designed to vibrate in the first bending vibration mode which is mirror-symmetrical with respect to the second measuring tube transverse plane; and at least a second elastic vibration coupler which couples the third measuring tube and the fourth measuring tube together symmetrically with respect to the second measuring tube transverse plane, in particular in the second measuring tube transverse plane, to the oscillator.

In a development of the invention, the second oscillator is similar with regard to its vibration properties, in particular with regard to the ratios of the oscillator resonant frequencies, to the first oscillator.

In a development of the invention, the third measuring tube is identical in design to the first measuring tube, and wherein the fourth measuring tube is substantially identical in design to the second measuring tube.

In a development of the invention, the second vibration coupler is identical in design to the first vibration coupler.

In a development of the invention, the exciter acts between a measuring tube of the first oscillator and the identically-designed measuring tube of the second oscillator.

In a development of the invention, the transducer further respectively comprises on the outlet side at least one, preferably two or more, gusset plates, wherein each of the measuring tubes is respectively connected at least to one identically-designed measuring tube on the inlet side and on the outlet side by means of at least one gusset plate.

In a development of the invention, the idle position distance of the fastening points of a vibration coupler at the measuring tubes coupled by means of the vibration coupler has a change coefficient at temperatures between 20° C. to 80° C., which change coefficient deviates from the coefficient of thermal expansion of the material of the vibration coupler by no more than 50%, in particular no more than 20%, preferably no more than 10%.

BRIEF DESCRIPTION OF THE DRAWING

The invention will now be explained in further detail on the basis of the exemplary embodiment shown in the figures. Shown are:

FIG. 5 shows a schematic detailed cross-sectional view in the measuring tube transverse plane in the region of the vibration coupler of a third exemplary embodiment; and FIG. 6 shows a schematic detailed cross-sectional view in the measuring tube transverse plane in the region of the vibration coupler of a fourth exemplary embodiment.

DETAILED DESCRIPTION

Figure 1B:
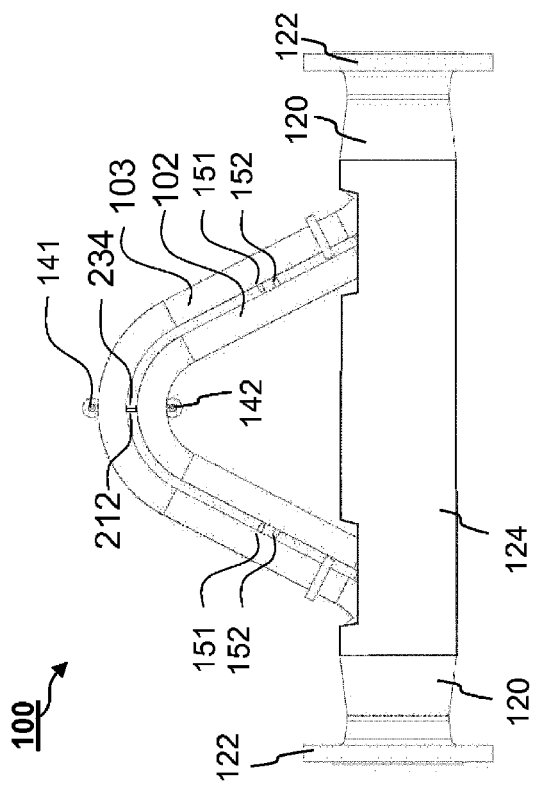
FIG. 1b shows a side view of the first exemplary embodiment of a sensor according to the present disclosure.
Figure 1D:
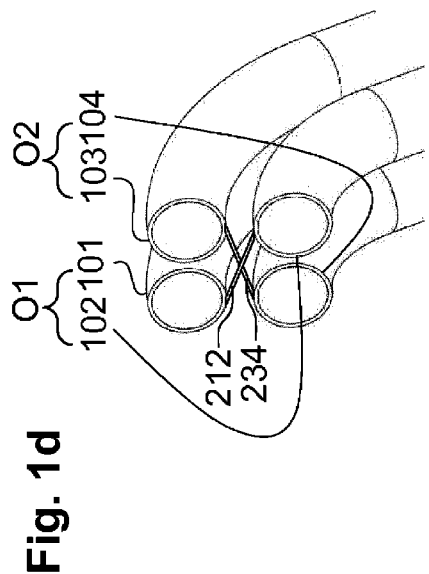
FIG. 1d shows a schematic detailed view of the first exemplary embodiment of a sensor according to the present disclosure.
Figure 1A:
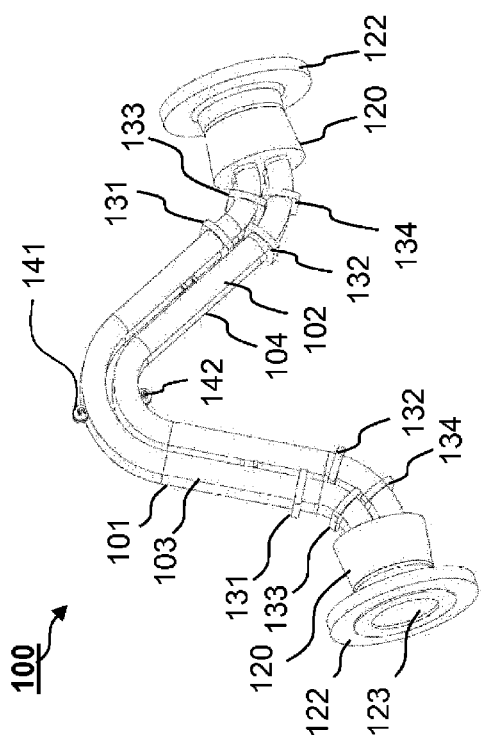
FIG. 1a shows a spatial representation of a first exemplary embodiment of a sensor according to the present disclosure.
Figure 1C:
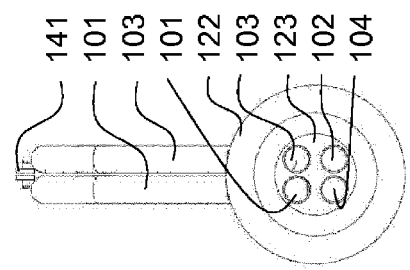
FIG. 1c shows a front view of the first exemplary embodiment of a sensor according to the present disclosure.

The exemplary embodiment of a sensor 100 according to the invention shown in FIGS. 1a through 1d comprises four curved measuring tubes 101, 102, 103, 104. The measuring tubes 101, 102, 103, 104 extend between an inlet-side collector 120 and an outlet-side collector 120, and are fixedly connected to the collectors 120, for example, by rolling, brazing, or welding. Extending between the collectors 120 is a solid support tube 124 fixedly connected to both collectors, thereby rigidly coupling the collectors 120 together. On its upper side, the support tube 124 has openings through which the measuring tubes 101, 102, 103, 104 are guided from the collectors 120 out of the support tube 124 and back again.

At their ends, the collectors 120 respectively have a flange 122, by means of which the sensor 100 is to be installed in a pipeline. Through openings 123 in the flanges 122, a medium can be guided through the sensor 100, in particular its measuring tubes 101, 102, 103, 104, in order to determine the mass flow rate and/or the density of the medium. The first measuring tube 101 and the second measuring tube 102 are coupled by means of a first vibration coupler 212 to a first oscillator O1. The third measuring tube 103 and fourth measuring tube 104 are coupled by means of a second vibration coupler 234 to a second oscillator O2 (for the sake of clarity, the vibration couplers are not shown in FIG. 1a).

Before the functionality of the sensor 100 according to the invention is explained further, some symmetry properties of the sensor according to the invention shall be briefly explained with reference to FIGS. 2a and 2b. FIG. 2a shows a first measuring tube center line 111 of the first measuring tube 101, a second measuring tube center line 112 of the second measuring tube 102, a third measuring tube center line 113 of the third measuring tube 103, and a fourth measuring tube center line 114 of the fourth measuring tube 104. The measuring tube center lines are respectively given by the midpoints of a series of tube cross-sections along the course of a measuring tube.

Assigned to each of the measuring tubes 101, 102, 103, 104 is a measuring tube longitudinal plane Syz-1, Syz-2, Syz-3, Syz-4, in relation to which the integral of the squares of the distance of the respective measuring tube center line is minimal. In particular, the measuring tube center lines can run completely in the respective measuring tube longitudinal plane.

Figure 2B:
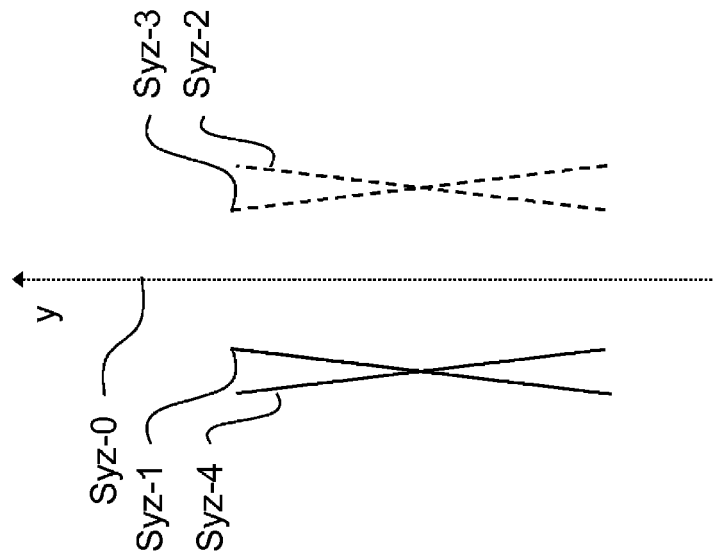
FIG. 2b shows a sketch for illustrating general symmetry conditions of a sensor according to the present disclosure.
Figure 2A:
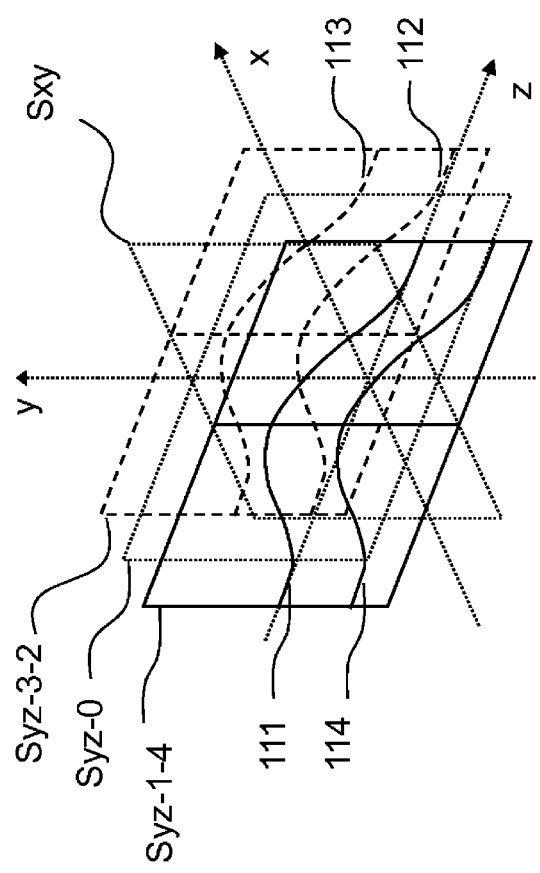
FIG. 2a shows a sketch for illustrating symmetries of a preferred exemplary embodiment of a sensor according to the present disclosure.

The measuring tube longitudinal planes Syz-1, Syz-2, Syz-3, Syz-4 intersect the measuring tube transverse plane Sxy perpendicularly, as shown in FIG. 2b, which shows a top view of the measuring tube transverse plane. In the general case shown there, each measuring tube has its own measuring tube longitudinal plane Syz-1, Syz-2, Syz-3, Syz-4, wherein the measuring tube transverse planes can absolutely coincide in pairs, as shown in FIG. 2a for the symmetries of the exemplary embodiment of FIGS. 1a through 1d. Accordingly, the first and fourth measuring tube longitudinal planes lie in a common measuring tube longitudinal plane Syz-1-4, and the third and second measuring tube longitudinal planes lie in a common measuring tube longitudinal plane Syz-3-2.

Each of the measuring tube center lines 111, 112, 113, 114 extends symmetrically in relation to a common measuring tube transverse plane Sxy, which is accordingly intersected perpendicularly by the measuring tube center lines. The first measuring tube center line 111 and the third measuring tube center line 113 run symmetrically to each other with respect to a sensor longitudinal plane Syz-0. The second measurement tube center line 112 and the fourth measuring tube center line 114 also run symmetrically to each other with respect to the sensor longitudinal plane Syz-0.

The measuring tube longitudinal planes Syz-1, Syz-2, Syz-3, Syz-4 run parallel to the sensor longitudinal plane Syz-0 in the first exemplary embodiment.

The intersection line between the measuring tube transverse plane Sxy and the sensor longitudinal plane Syz-0 defines a Y-axis of a coordinate system for describing the sensor. A Z-axis of the coordinate system runs perpendicularly to the measuring tube transverse plane and intersects the Y-axis in the common origin. The X-axis runs perpendicularly to the other axes and intersects them in the common origin. With the thus defined coordinates, we turn to FIGS. 1a through 1d.

The first measuring tube 101 and the third measuring tube 103 are each connected to two gusset plates 131 and 133 on the inlet side and on the outlet side, wherein free vibrating lengths of the first measuring tube 101 and of the third measuring tube 103 are fixed by the position of the two inner of the gusset plates 131, i.e., by the gusset plates that are furthest away from the corresponding collector 120 on the inlet side and on the outlet side, respectively. Accordingly, the second measuring tube 102 and the fourth measuring tube 104 are each connected to two gusset plates 132 and 134 on the inlet side and on the outlet side, wherein free vibrating lengths of the second measuring tube 102 and of the fourth measuring tube 104 are fixed by the position of the two inner of the gusset plates 132. Due to the symmetries, the measurement tubes running symmetrically to each other with respect to the sensor longitudinal plane respectively have the same vibrating length, and thus the same vibration properties, except for minimal deviations due to manufacturing tolerances. This means that they would have, for example, substantially the same resonant frequencies in pairs without the vibration couplers 212, 234, which resonant frequencies are respectively determined, in particular, by the free vibrating lengths of the measuring tubes. Insofar as the second and the fourth measuring tubes 102, 104 have a different shape than the first and third measuring tubes 101, 103, the two pairs of measuring tubes have different vibration properties and, in particular, different resonant frequencies, wherein it is desirable to keep the differences as minor as possible. Due to the coupling of the measuring tubes by the two vibration couplers 212, 234 to the first and second oscillators O1, O2, the measuring tubes vibrate in the bending vibration modes of the oscillators resulting from the coupling of the bending vibration modes of the measuring tubes involved. The bends have resonant frequencies, which deviate from those of the bending vibration modes of the coupled measuring tubes.

The so-called useful mode, i.e., the bending vibration mode in which measuring tubes are usually excited in a generic sensor, splits into two bending vibration modes of the oscillators—oscillator vibration modes, for short—as a result of the coupling of the measuring tubes. In a first oscillator vibration mode, the first oscillator O1 vibrates against the second oscillator O2, wherein the two measuring tubes of an oscillator respectively vibrate in phase, i.e., move in the positive X-direction at the same time. In a second oscillator vibration mode, the first oscillator O1 vibrates against the second oscillator O2, wherein the two measuring tubes of an oscillator respectively vibrate in counterphase, i.e., move simultaneously in the opposite X-direction. The second oscillator vibration mode has a higher resonant frequency than the first oscillator vibration mode. How strongly the resonant frequencies of the first and second oscillator vibration modes differ from one another depends upon the stiffness of the vibration couplers in relation to the stiffness of the measuring tubes. Design possibilities in this respect are shown below. In any case, the frequency separation should exhibit a multiple of a resonance width of the oscillator vibration modes to prevent crosstalk between the oscillator vibration modes. The coupling of the measuring tubes to two oscillators causes the measuring tubes to vibrate in defined phases relative to one another and the vibration modes to not interfere with one another.

Figure 3B:
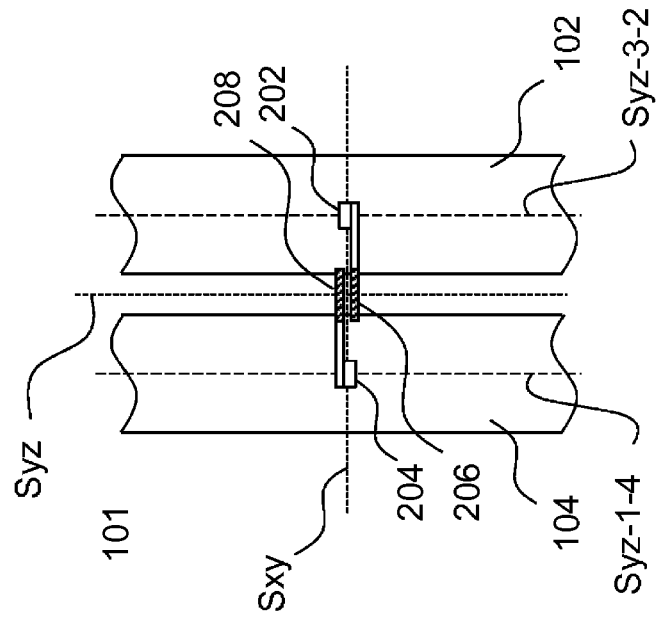
FIG. 3b shows a schematic detailed view along line A-A of FIG. 3a of the second and fourth measuring tubes of the first exemplary embodiment.
Figure 3A:
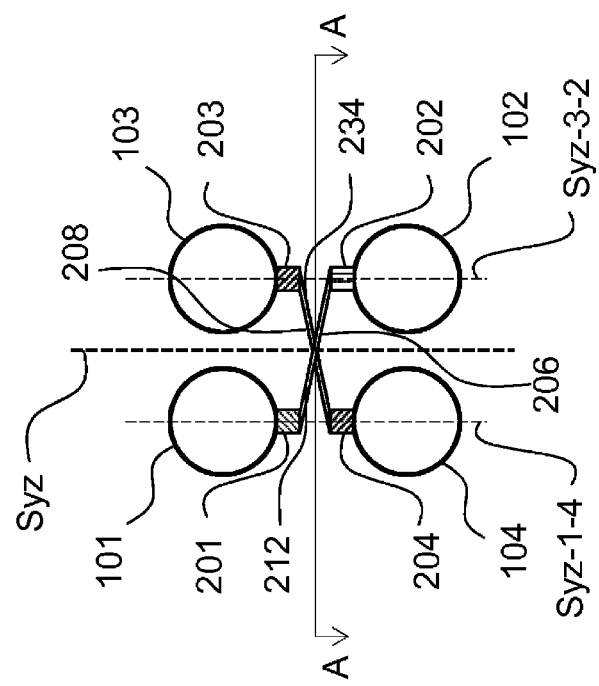
FIG. 3a shows a schematic detailed cross-sectional view in the measuring tube transverse plane in the region of the vibration coupler of a first exemplary embodiment.

A first embodiment of vibration couplers is shown in FIGS. 3a and 3b. FIG. 3a shows a simplified cross-section of the measuring tubes 101, 102, 103, 104 in the measuring tube transverse plane. A first vibration coupler 212 extends diagonally from the saddle point of the first measuring tube 101 to the apex of the second measuring tube 102. The first vibration coupler 212 comprises a first straight coupler strip 206 extending between a first coupler foot 201 and a second coupler foot 202. The first and second coupler feet 201, 202 are fixed in place at the saddle point of the first measuring tube 101 or apex of the second measuring tube 202, respectively, by means of joining, in particular welding or brazing. The first coupling strip 206 is either designed to be integral with the associated coupler feet 201, 202 or connected thereto by joining.

A second vibration coupler 234 extends diagonally from the saddle point of the third measuring tube 103 to the apex of the fourth measuring tube 104. The second vibration coupler 234 comprises a second straight coupling strip 206 extending between a third coupler foot 203 and a fourth coupler foot 204. The third and fourth coupler feet 203, 204 are fixed in place at the saddle point of the third measuring tube 103 or apex of the fourth measuring tube 204, respectively, by means of joining, in particular welding or brazing. The second coupling strip 206 is either designed to be integral with the associated coupler feet 203, 204 or connected thereto by joining. The top view shown in FIG. 3b of the third and fourth measuring tubes 103, 104 from the plane A-A in FIG. 3a shows the position of the second and fourth coupler feet 102, 104, as well as the course of the coupling strips 206, 208 below the plane A-A. The coupling strips 206, 208 are spaced apart from one another in order to eliminate friction between them, but they are positioned as closely as possible to the measuring tube transverse plane in order to minimize the introduction of bending moments, which could influence, in particular, the so-called Coriolis mode. The vibration couplers are made of a metallic material, preferably of the same material as the measuring tubes. For the sake of clarity, vibration exciters, which are also positioned in the measuring tube transverse plane, are not shown in FIG. 3a.

Figure 4A:
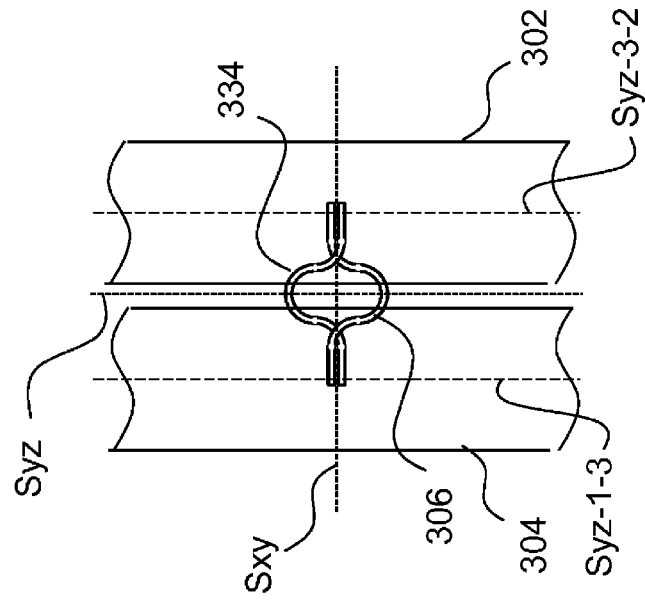
FIG. 4a shows a schematic detailed cross-sectional view in the measuring tube transverse plane in the region of the vibration coupler of a second exemplary embodiment.
Figure 4B:
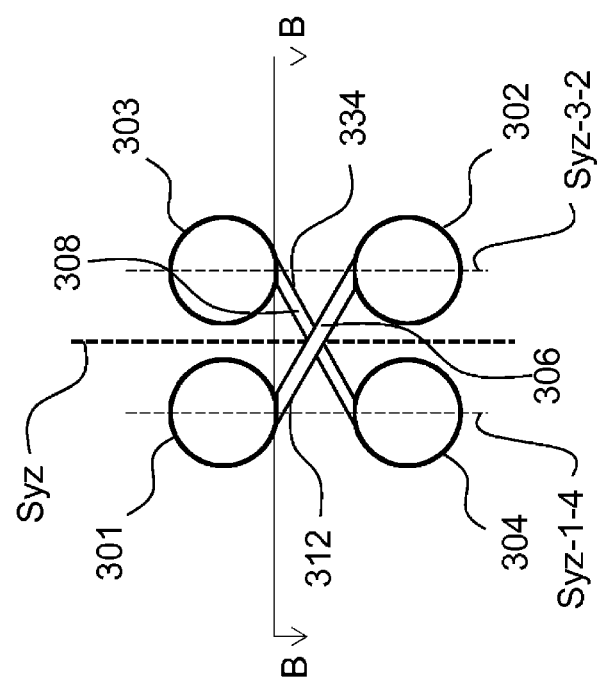
FIG. 4b shows a schematic detailed view along line B-B of FIG. 4a of the second and fourth measuring tubes of the second exemplary embodiment.

A second embodiment of vibration couplers is shown in FIGS. 4a and 4b. FIG. 4a shows a simplified cross-section of the measuring tubes 301, 302, 303, 304 in the measuring tube transverse plane. A first vibration coupler 312 extends diagonally from the saddle point of the first measuring tube 301 to the apex of the second measuring tube 302. The first vibration coupler 312 comprises a first arcuate coupler strip 306 fixed in place with its ends at the saddle point of the first measuring tube 301 and apex of the second measuring tube 302 by means of joining, in particular welding or brazing.

A second vibration coupler 334 extends diagonally from the saddle point of the third measuring tube 303 to the apex of the fourth measuring tube 304. The second vibration coupler 334 comprises a second arcuate coupling strip 308, which is fixed in place with its ends at the saddle point of the third measuring tube 303 or apex of the fourth measuring tube 304, respectively, by means of joining, in particular welding or brazing. The top view shown in FIG. 4b of the second and fourth measuring tubes 302, 304 from the plane B-B in FIG. 4a shows the course of the two coupling strips 306, 308 below the plane B-B. The arcuate course of the coupling strips 306, 308 makes it possible to guide the coupling strips past one another and still position the ends of the coupling strips in or near the measuring tube transverse plane in order to minimize the introduction of bending moments which could influence, in particular, the so-called Coriolis mode. The vibration couplers 312, 334 are made of a metallic material, preferably of the same material as the measuring tubes. For the sake of clarity, vibration exciters, which are also positioned in the measuring tube transverse plane, are not shown in FIG. 4a. By the design of the curved course of the coupling strips 306, 308, the stiffness of the vibration couplers can be controlled. The frequency separation between the first and second oscillator vibration modes can thus be adjusted to a desired value. In addition, mechanical stress peaks can be avoided, in particular, in the second oscillator vibration mode.

The sensor is preferably operated in the first oscillator vibration mode, which stresses the material of the vibration couplers and the associated fastenings on the measuring tube less, whereby, in particular, the risk of plastic deformations in the region of the vibration coupler is significantly reduced. Basically, however, the sensor can also be operated in the second oscillator vibration mode, in particular for diagnostic purposes.

In the illustration of the exemplary embodiments with diagonal vibration couplers, the need, which is founded in the diagonal course of the vibration couplers, for an arbitrary determination exists with respect to the definition of a counterphase and an in-phase vibration. What happens in-phase from the perspective of a respective vibration coupler (simultaneous movement in the positive x-direction) is counterphase in relation to the sensor longitudinal plane (the first and the third measuring tubes approach each other, while the fourth and the second measuring tubes diverge from each other). In the present invention, the decision was made to call the low-frequency, lower-tension first oscillator vibration mode "in-phase."

In order to excite the bending vibrations of the measuring tubes of the oscillators O1 and O2 in the X-direction, an electrodynamic exciter arrangement 141 is arranged in the measuring tube transverse plane Sxy between the first measuring tube 101 and the third measuring tube 103. The exciter arrangement 141 comprises a plunger coil on one of the two measuring tubes and a plunger body on the opposite measuring tube. The exciter arrangement is positioned at the apexes of the first and third measuring tubes in the measuring tube transverse plane. Further provided is a second electrodynamic exciter arrangement 142, which acts between the second measuring tube 102 and the fourth measuring tube and is, in particular, identical in design to the first exciter arrangement. The second exciter arrangement 142 is positioned at the saddle points of the second and fourth measuring tubes in the measuring tube transverse plane (for the sake of clarity, the exciter arrangements are not shown in FIG. 1d).

By feeding alternating current signals of suitable frequency and phasing to the plunger coils, the measuring tubes are excited to vibrate, wherein the vibrations are coupled by means of the first vibration coupler 212 between the first measuring tube 101 and the second measuring tube 102, and by means of the second vibration coupler 234 between the third measuring tube 103 and the fourth measuring tube 104.

In the first, in-phase oscillator vibration mode, the two exciter arrangements must exert an attractive force in counterphase. In the second, counterphase oscillator vibration mode, the two exciter arrangements must exert an attractive force in-phase.

In order to sense the vibrations between the first measuring tube 101 and the third measuring tube 103, two electrodynamic sensor arrangements 151, each with a plunger coil on one tube and a plunger body on the other tube, are arranged symmetrically with respect to the measuring tube transverse plane between the first measuring tube 101 and the third measuring tube 103. Accordingly, in order to sense the vibrations between the second measuring tube 102 and the fourth measuring tube 104, two electrodynamic sensor arrangements 152, each with a plunger coil on one tube and a plunger body on the other tube, are arranged symmetrically with respect to the measuring tube transverse plane between the second measuring tube 102 and the fourth measuring tube 104. Details respecting this are known to the person skilled in the art and need not be explained in more detail here. (For the sake of clarity, the positions of the exciter arrangement and the sensor arrangements were shown and provided with reference symbols only in FIG. 1b).

In addition to the previously described exemplary embodiments with diagonal vibration couplers, the invention also includes sensors with a vibration coupling of the measuring tubes lying directly above one another, as described below with reference to the two exemplary embodiments shown in FIGS. 5 and 6.

The third exemplary embodiment illustrated in FIG. 5 differs from the first two exemplary embodiments only in the type of vibration coupling. FIG. 5 shows a simplified cross-section of the measuring tubes 401, 402, 403, 404 in the measuring tube transverse plane. A first vibration coupler 414 extends vertically from the saddle point of a first measuring tube 401 to the apex of a second measuring tube 404. The first vibration coupler 401 comprises a first metallic coupler strip which is fixed in place with its ends at the saddle point of the first measuring tube 401 and apex of the second measuring tube 404 by means of joining, in particular welding or brazing. A second vibration coupler 432 extends vertically from the saddle point of a third measuring tube 403 to the apex of a fourth measuring tube 402. The second vibration coupler 432 comprises a second metallic coupler strip which, with its ends, is fixed in place at the saddle point of the third measuring tube 401 and apex of the fourth measuring tube 404 by means of joining, in particular welding or brazing.

The fourth exemplary embodiment illustrated in FIG. 6 has a vibration coupling similar to that of the third exemplary embodiment. FIG. 6 shows a simplified cross-section of the measuring tubes 501, 502, 503, 504 in the measuring tube transverse plane. A first vibration coupler 514 extends vertically from the saddle point of a first measuring tube 501 to the apex of a second measuring tube 504. The first vibration coupler 501 comprises a first, arcuately extending, metallic coupler strip which, with its ends, is fixed in place at the saddle point of the first measuring tube 501 and apex of the second measuring tube 504 by means of joining, in particular welding or brazing. A second vibration coupler 532 extends vertically from the saddle point of a third measuring tube 503 to the apex of a fourth measuring tube 502. The second vibration coupler 532 comprises a second, arcuately extending, metallic coupler strip which, with its ends, is fixed in place at the saddle point of the third measuring tube 501 and apex of the fourth measuring tube 404 by means of joining, in particular welding or brazing.

The design of the arcuate course of the coupler strips allows controlled adjustment of the stiffness of the vibration couplers. The frequency separation between the first and second oscillator vibration modes can thus be adjusted to a desired value. In addition, mechanical stress peaks can be avoided, in particular in the second oscillator vibration mode.

In the basic bending vibration mode without vibration coupling, the outer, identically-designed measuring tubes 101, 103; 401, 403; 501, 503 have a resonant frequency of approximately 150 Hz, wherein the corresponding resonant frequency of the inner, identically-designed measuring tubes 102, 104; 402, 404; 502, 504 is greater by about 0.2 Hz. The first oscillator resonant frequency of the coupled measuring tubes of the oscillator vibration mode in-phase is essentially the mean of the above frequencies. Depending upon the stiffness of the vibration coupler, the second oscillator resonant frequency of the counterphase oscillator vibration mode is about 156 Hz to about 270 Hz.

The invention claimed is:

1. A method of operating a vibration-type sensor for measuring the density and/or mass flow rate of a medium, wherein the sensor comprises:
  a first oscillator and a second oscillator, the first oscillator comprising:
    a first measuring tube that is curved in its idle position and has a first measuring tube center line, which extends mirror-symmetrically with respect to a first measuring tube transverse plane, wherein the first measuring tube is configured to vibrate in a first bending vibration mode, which is mirror-symmetrical in relation to the first measuring tube transverse plane;
    a second measuring tube that is curved in its idle position and has a second measuring tube center line, which extends mirror-symmetrically with respect to the first measuring tube transverse plane, wherein the second measuring tube is configured to vibrate in the first bending vibration mode;
    an elastic first vibration coupler adapted to couple the first measuring tube and the second measuring tube together to form the first oscillator; and
    a first exciter for exciting oscillator vibrations at least in the first bending vibration mode,
    wherein a first measuring tube longitudinal plane is defined in which an integral over the square of a distance between the first measuring tube center line and the first measuring tube longitudinal plane is minimal, wherein the first measuring tube vibrates substantially perpendicular to the first measuring tube longitudinal plane when in the first bending vibration mode,
    wherein a second measuring tube longitudinal plane is defined in which an integral over the square of a distance between the second measuring tube center line and the second measuring tube longitudinal plane is minimal, wherein the second measuring tube vibrates substantially perpendicular to the second measuring tube longitudinal plane when in the first bending vibration mode, wherein the first measuring tube and the second measuring tube are curved in the same direction,
    wherein the first oscillator has a first oscillator resonant frequency for a first vibration mode in which the first measuring tube and the second measuring tube vibrate approximately in phase in the first bending vibration mode, wherein the first oscillator has a second oscillator resonant frequency for a second vibration mode in which the first measuring tube and the second measuring tube vibrate approximately in counterphase in the first bending vibration mode, and wherein the second oscillator resonant frequency is greater than the first oscillator resonant frequency, and
    wherein, without the first vibration coupler, the first measuring tube has a first measuring tube resonant frequency for the first bending vibration mode, and the second measuring tube has a second measuring tube resonant frequency for the first bending vibration mode, wherein the first measuring tube resonant frequency and second measuring tube resonant frequency differ from their arithmetic mean by no more than 8%,
    wherein the first vibration coupler couples the first measuring tube and the second measuring tube together symmetrically with respect to the first measuring tube transverse plane, thereby forming the first oscillator,
  wherein the second oscillator comprises:
    a third measuring tube having a third measuring tube center line that extends mirror-symmetrically with respect to a second measuring tube transverse plane, wherein the third measuring tube is configured to vibrate in a second bending vibration mode, which is mirror-symmetrical with respect to the second measuring tube transverse plane;
    a fourth measuring tube having a fourth measuring tube center line that extends mirror-symmetrically with respect to the first measuring tube transverse plane, wherein the second measuring tube is designed to vibrate in the second bending vibration mode;
    at least an elastic second vibration coupler adapted to couple the third measuring tube and the fourth measuring tube together symmetrically with respect to the second measuring tube transverse plane, thereby forming the oscillator; and
    a second exciter for exciting oscillator vibrations at least in the first bending vibration mode, wherein the second oscillator is similar to the first oscillator with respect to its ratios of the oscillator resonant frequencies, wherein the third measuring tube is identical in structure to the first measuring tube, and wherein the fourth measuring tube is identical in structure to the second measuring tube, wherein the second vibration coupler is identical in structure to the first vibration coupler, wherein the vibration first and second vibration couplers are arranged diagonally between the measuring tubes, and wherein the first exciter operates between the first measuring tube and the third measuring tube, wherein the second exciter operates between the second measuring tube and the fourth measuring tube of the second oscillator, respectively, the method comprising exciting the first oscillator and the second oscillator of the sensor with the first oscillator resonant frequency to excite the first vibration mode by feeding alternating current signals of suitable frequency and phasing to the first and second exciters, wherein the vibrations are coupled via the first vibration coupler between the first measuring tube and the second measuring tube and via the second vibration coupler between the third measuring tube and the fourth measuring tube, wherein the first and second exciters exert an attractive force in counterphase.

2. The method of claim 1, wherein the second oscillator resonant frequency is no more than 2.25 times the first oscillator resonant frequency.

3. The method of claim 1, wherein the second oscillator resonant frequency is at least 4% greater than the first oscillator resonant frequency.

4. The method of claim 1, wherein the first measuring tube longitudinal plane is inclined with respect to the second measuring tube longitudinal plane by no more than 8°.

5. The method of claim 1, wherein the sensor further comprises:
one collector each on an inlet side and on an outlet side of the first oscillator, wherein the first and second measuring tubes are fluidically combined on the inlet side and on the outlet side, respectively, with the collectors, wherein the collectors are configured to be stable and thereby function as a gusset plate; and
a support body rigidly connecting the collector on the inlet side and the collector on the outlet side.

6. The method of claim 1, further comprising at least two gusset plates, wherein each of the measuring tubes is connected at least to one identically structured measuring tube, respectively, on the inlet side and on the outlet side using at least one gusset plate.

7. The method of claim 1, wherein the first vibration coupler includes fastening points where coupled to the first and second measuring tubes, which at least in part define an idle position distance, wherein the idle position distance has a change coefficient at temperatures between 20° C. and 80° C., which change coefficient deviates from a coefficient of thermal expansion of a material of the first vibration coupler by no more than 50%.

* * * * *